United States Patent Office

3,789,050
Patented Jan. 29, 1974

3,789,050
PROCESS AND COMPOSITIONS OF RUBBER VULCANIZATES WITH SILICONE POLYMERIZATES
Domingos Loricchio, Sao Paulo, Brazil, assignor to The Carborundum Company, Niagara Falls, N.Y.
No Drawing. Filed Apr. 20, 1971, Ser. No. 135,764
Int. Cl. C08c *11/08*
U.S. Cl. 260—41.5 R                                13 Claims

ABSTRACT OF THE DISCLOSURE

A process for making improved compositions of rubber vulcanizates, simultaneously polymerized with silicones to give improved abrasion resistant bodies containing powders or granules of abrasive inorganic materials. The bodies are formed under pressure of about 2 kg./cm.$^2$ and temperatures of 100–180° C.

CROSS REFERENCES TO RELATED APPLICATIONS

The material in this application is based on that disclosed in Brazilian provisional application No. 218,454, filed Apr. 22, 1970 and the complete application of the same number, filed Jan. 15, 1971.

BACKGROUND OF THE INVENTION

Articles made from vulcanized rubber have great commercial value and have been fabricated in many forms for industrial and scientific applications. It was quickly discovered that the utility of rubber articles depended greatly on the types of fillers that were incorporated, so that the physical properties of the article could be changed at will. Among the various fillers used are carbon black, zinc and magnesium oxides, calcium carbonate and silicate, silicon dioxide, magnesium carbonate and various clays. Other additives may be sulfur or sulfur compounds, both inorganic and organic for vulcanization accelerators, secondary aromatic amines and phenolic compounds as antioxidants and stabilizers and aromatic thiols and sulfides as pepticizers. These additives are usually liquids or finely divided solids, so there is little difficulty in forming the proper blends with the rubber or in separation of the components after vulcanization, since nearly all of the additives are chemically incorporated with the vulcanized rubber structure.

Rubber compositions containing particulate or granular materials, such as abrasive grains, have been generally unsatisfactory due to grain separation. The elastic properties of the rubber matrix, as contrasted to the nonelasticity of the particulate grains of enclosed material cause a rapid failure of the bonds between rubber and particle. The particles are loosened and the composition may disintegrate, destroying the utility of the article. Articles subjected to mechanical stresses such as stretching, flexing, bending or compression can continue their functions only if special precautions are taken to provide strong and enduring bonds between the elastic matrix and the filler particles. While some progress has been made in this direction in the past, there is still a need for an improved bonding method, especially for holding abrasive particles since these bonds are subjected to high shearing stresses during use.

For the purposes of this invention, abrasives are defined as those materials which have a hardness over 7, as rated on the Mohs' hardness scale. This is a class of material comprising electrofused aluminas or aluminum oxides, green and black silicon carbides, natural corundum, synthetic mullites, boron carbides and other natural and synthetic material having a Mohs' hardness of over 7.

SUMMARY OF THE INVENTION

The invention provides a method for effecting an improved vulcanization of rubber, either natural or synthetic, with a simultaneous polymerization of silicones which have been added to the elastomeric mass. This method and composition is especially useful in the fabrication of articles containing particulate fillers such as grains or powders of hard abrasive materials. Chemical pretreatment of these particles, followed by silicone coating and polymerization in the vulcanized rubber mass, gives an article in which the solids are firmly bonded within the rubber matrix.

DESCRIPTION OF THE INVENTION

Suitable pretreatment of the abrasive grains or powders is very desirable for the successful practice of the invention. The grains are processed in cylinder mills which rotate at different speeds and in opposed directions to give a splitting or fracture of the grains as they pass through the mill. This action increases the surface area of the grain. The grains or powders are then heated for about 10 hours at temperatures of 70–100° C. in appropriate chemical solutions, particularly those of concentrated inorganic acids, to etch the surfaces of the grains or powder particles. This chemical action produces micropores on the particle surfaces which act as retention points for the silicone precoat layer.

The precoating treatment of the grains and powders may be effected with silicones of high molecular weight, preferably linear silicones or resins which are soluble in organic acetates. The silicones may contain organic groups such as ethyl or ethyl and butyl, such groups being either functional or hydrocarbon and being attached either to side chains or directly to the silicon atoms. An example of a suitable silicone is a phenyl and methyl substituted polysiloxane resin containing from at least 0.25 to about 6 weight percent of silicon-bonded OH groups, manufactured by Dow Corning Corporation.

After the grains or powders have received their silicone treatment, they are dried in an oven at 70–100° C. and then incorporated into the rubber mass. This may be either a natural rubber or a synthetic product such as a neoprene, butyl or nitrile rubber. The composition of the mass will vary, depending on the type of product desired. The mixture is then heated to temperatures ranging from 100–180° C. but preferably at 120–140° C. under a pressure of 2 kg./cm.$^2$, during which time vulcanization of the rubber and polymerization of the silicone coating on the solids takes place simultaneously. A firm bond is created between solids and rubber through the organic moiety of the silicone resin. Polymerization and vulcanization times are about 45 minutes.

For a better understanding of the processes of this invention, the following examples are shown:

Example 1.—Composition for tire treads

|  | Parts |
|---|---|
| Rubber | 108 |
| Stearic acid | 3 |
| Antioxidant | 1 |
| Zinc oxide | 3 |
| Carbon black | 25 |
| 2-mercaptobenzothiazole | 3 |
| Sulfur | 1 |
| Peptizer | 1 |
| Resin oil | 1 |
| Aluminum oxide grains, 20–40 mesh | 40 |
| Silicon carbide, 325 mesh | 20 |

Example 2.—Composition for shoe soles

|  | Parts |
|---|---|
| Rubber | 105 |
| Zinc oxide | 5 |
| Carbon black | 2 |
| Stearic acid | 2 |
| Resin oil | 1.5 |
| "Thermoflex" (di-paramethoxy-diphenyl amine and diphenyl paraphenylene diamine) | 1.4 |
| "Neozone D" (phenyl-2-naphthylamine) | 0.6 |
| "Zenite b" (zinc benzothiazolyl mercaptide) | 1.2 |
| Sulfur | 3 |
| Silicon carbide, 325 mesh | 7 |
| Aluminum oxide, 30–60 mesh | 8 |

Example 3.—Composition for driving and conveyor belts

|  | Parts |
|---|---|
| Rubber | 65 |
| Stearic acid | 0.6 |
| Pine resin | 1.8 |
| Zinc oxide | 30 |
| Antioxidant | 0.9 |
| Benzothiazole sulfide | 0.6 |
| Thiuram (tetra methyl thiuram disulfide) | 0.5 |
| Sulfur | 0.5 |
| Silicon carbide, 325 mesh | 10 |
| Aluminum oxide, 30–100 mesh | 10 |

The mixtures in the three examples above were vulcanized for about 45 minutes at temperatures of 120–140° C., under a pressure of 2 kg./cm.² The improved process of the invention gives finished products with increased densities and electrical resistivities. The heat resistance of the products may be increased by using inorganic fillers such as mullites, sillimanites or cyanites. Thermal conductivity is increased by using substantial amounts of silicon carbide as a filler. An increased friction coefficient, along with an increase of up to 400% in abrasion resistance, makes the products of the invention especially suitable for uses such as tire treads, shoe soles, brake linings and transmission and conveyor belts, designed for extended service under hard wearing conditions.

What is claimed is:

1. An article comprising a mass of vulcanized elastomeric rubber, abrasive grains of inorganic materials having a hardness greater than 7 in the Mohs' scale, and a high molecular weight silicone resin having reactive functional and hydrocarbon organic groups coated on said grains, said coated grains being disposed in the rubber mass and secured within the mass by polymerized silicone bonds; the elastomeric mass comprising from about 66 to about 82 percent of the article and the abrasive grains comprising from about 11 to about 29 percent.

2. An article according to claim 1 in which the rubber mass comprises a synthetic rubber.

3. A process for obtaining vulcanized elastomeric rubber articles containing about 11 to about 29 percent abrasive grains, the process comprising:
   (a) precoating the grains with a silicone resin of high molecular weight and having reactive functional and hydrocarbon organic groups;
   (b) drying the grains;
   (c) incorporating the grains into a mass of rubber; and
   (d) simultaneously polymerizing the silicone resin coating and vulcanizing the mass to produce the abrasive containing article.

4. A process according to claim 3, comprising the additional preliminary step, prior to precoating the grains with a silicone resin, of heating the grains with concentrated inorganic acid at temperatures of 70 to 100° C. to etch the surface of the grains.

5. A process according to claim 3 in which the precoated grains are dried at temperatures of 70 to 100° C.

6. A process according to claim 3 in which the mass is vulcanized at temperatures of 120 to 140° C. and a pressure of 2 kg./cm.²

7. A process according to claim 3, in which the silicone is a phenyl and methyl substituted polysiloxane resin containing from at least 0.25 to about 6 weight percent of silicon-bonded OH groups.

8. A process according to claim 3 in which the rubber is selected from the group consisting of natural, neoprene, butyl and nitrile rubber.

9. A vulcanizable composition comprising an elastomeric mass of rubber, abrasive grains of inorganic materials having a hardness greater than 7 in the Mohs' scale, and a phenyl and methyl substituted polysiloxane resin containing from at least 0.25 to about 6 weight percent of silicone-bonded OH groups, the resin being coated on said grains and the coated grains being dispersed within the rubber mass; the rubber mass comprising from about 66 to about 82 percent of the composition and the abrasive grains comprising from about 11 to about 29 percent.

10. A vulcanizable composition according to claim 9 in which the abrasive grains are selected from the group consisting of electrofused aluminum oxide, silicon carbide, natural corundum, synthetic mullite, boron carbide, and mixtures thereof.

11. A vulcanizable composition according to claim 10 in which the abrasive grains consist essentially of silicon carbide and aluminum oxide.

12. An article according to claim 1, comprising an elastomeric mass of vulcanized rubber, abrasive grains of inorganic materials having a hardness greater than 7 in the Mohs' scale, and a phenyl and methyl substituted polysiloxane resin of high molecular weight, the resin containing from at least 0.25 to about 6 weight percent of silicon-bonded OH groups, the resin being coated on said grains and polymerized during vulcanization, the coated grains being dispersed within and bonded to the rubber mass.

13. An article according to claim 12 in which the abrasive grains are a mixture of silicon carbide and aluminum oxide.

References Cited

UNITED STATES PATENTS

| 3,481,723 | 12/1969 | Kistler et al. | 51—299 X |
| 3,567,680 | 3/1971 | Iannicelli | 260—41.5 A |
| 3,627,724 | 12/1971 | Lambert | 260—41.5 A |
| 3,041,156 | 6/1962 | Rowse et al. | 117—100.5 |
| 3,421,922 | 1/1969 | Wilson | 117—47 R |
| 3,264,260 | 8/1966 | Muller et al. | 260—41.5 A |

OTHER REFERENCES

Kirk-Othmer "Encyclopedia of Sci. & Techn." (2nd ed.) (vol. 1), page 376 (Interscience) (N.Y.) (1963), TP 9E68.

MORRIS LIEBMAN, Primary Examiner

H. H. FLETCHER, Assistant Examiner

U.S. Cl. X.R.

51—299; 106—36; 117—47 R, 100 B; 152—330; 188—256; 260—41.5 A